United States Patent [19]

Sadashige

[11] 3,969,558

[45] July 13, 1976

[54] VENEER SHEET OF A PLURALITY OF THIN FLAT SECTIONS OF WOOD

[75] Inventor: Takeshi Sadashige, Fuchu, Japan

[73] Assignees: Dantani Plywood Co., Ltd., Kitakyushu; Sadashige Fancy Plywood Industries Co., Ltd., Fuchu, both of Japan

[22] Filed: Sept. 23, 1974

[21] Appl. No.: 508,366

Related U.S. Application Data

[62] Division of Ser. No. 379,962, July 17, 1973, Pat. No. 3,878,016.

[30] Foreign Application Priority Data

July 18, 1972 Japan .................................. 47-72230

[52] U.S. Cl. .................................. 428/58; 428/106; 156/159; 156/264; 156/304; 144/309 R; 144/309 A; 144/309 Y

[51] Int. Cl.² ...................... B32B 3/14; B32B 21/14; B32B 31/18; B27D 1/10

[58] Field of Search ................ 161/36, 56; 156/159, 156/258, 264–265, 304; 144/309 R, 309 P, 309 L, 309 Q; 428/57–58, 106, 44, 332

[56] References Cited

UNITED STATES PATENTS

| | | | |
|---|---|---|---|
| 934,927 | 9/1909 | Mengel | 161/56 |
| 1,734,826 | 11/1929 | Pick | 161/56 X |
| 2,139,880 | 12/1938 | Colucci | 161/36 X |
| 2,241,080 | 5/1941 | Carpenter | 161/56 |
| 2,782,468 | 2/1957 | Leonardson et al. | 161/56 |
| 3,730,820 | 5/1973 | Fields et al. | 161/56 X |

FOREIGN PATENTS OR APPLICATIONS

| | | | |
|---|---|---|---|
| 808,246 | 1/1959 | United Kingdom | 144/309 |

*Primary Examiner*—Philip Dier
*Attorney, Agent, or Firm*—Frank J. Jordan

[57] ABSTRACT

In producing a sheet of wood veneer having a large area adaptable for mass-production and adaptable to be made with various wood patterns, a log is divided into a plurality of individual flitches which are subsequently joined by adhesive to form a composite flitch. The composite flitch is subsequently sliced to form a sheet of wood veneer which may be joined to a substrate by adhesive. The sheet of veneer is formed while the wood is maintained with a moisture content more than the fiber saturation point of the wood.

6 Claims, 24 Drawing Figures

VENEER SHEET OF A PLURALITY OF THIN FLAT SECTIONS OF WOOD

This is a division of application Ser. No. 379,962, filed July 17, 1973, now U.S. Pat. No. 3,878,016.

BACKGROUND OF THE INVENTION

This invention relates to a process for producing sliced veneer and fancy board therefrom, and more particularly to a process for producing sliced veneer of a large area which is able to cover an entire substrate in one operational step.

In conventional processes for producing sliced wood veneer to be glued on a substrate, a log is longitudinally divided into various-sized small flitches and they are subsequently each sliced by means of a slicer or a rotary lather into sheets of thin veneer. The sheets of thinly sliced veneer are cut to have a suitable width by a guillotine or the like. Before gluing the sliced veneer onto a substrate, it is usual to correct unevenness on the surfaces of the sheets of veneer and to remove oil remaining thereon in the step of dividing.

According to this known process, however, the core timber *f* and triangular sections *e* of the logs (FIG. 1) wind up as scrap without being used in the sliced sheets of veneer. In addition the sides of the wood, as mentioned above, is cut off and is unavailablly, so in other words, only about 40% of the original log can be really used as a material for veneer in spite of the great value of lumber.

In addition, sliced sections of veneer of less than 0.3 mm thick are required to be patched onto the substrate and have to be cut one by one by hand in a known method and to overlap or fill in the gap in the sheets of veneer. The patching step is also effected by hand. Under present condition of such manufacturing, it can be said that 80% of the labor required throughout the process must be assigned to this patching and mending work. Such inefficiency in conventional manufacturing processes makes it necessary to store the sliced veneers which are not used under severly controlled conditions to keep them from transforming, falling into decay, or getting moldy due to changes of moisture content.

Prior to the present invention, the inventor herein made various trials and experiments to find an improved method relating to mass-producing sliced veneers of wide area and making use of available lumber, taking into account the aforementioned defects of known processes.

As an example of the inventors trials and experiments, original lumber or scrap timber was divided into a plurality of small rectangular solids or small flitches and joined together to form a laminated or composite flitch with water-resistant adhesive after drying. The laminated flitch was next boiled so that it had a moisture content more than the fiber saturation point (hereafter called the f.s.p.) and then thinly sliced by means of a slicer. However, it is well known in the field that swelling or shrinking occurs within lumber as the moisture content changes therein to less than the f.s.p. The phenomena also arose in the flitches used in this trial. Additionally, since the degree of this phenomena depends among other things upon the direction of the flitch relative to the axis of the wood, difficulty as regards warp and distortion occured in the finished veneer on account of the inner stress arising in the joined parts.

Therefore, according to the present invention, a new process has been devised in the form of an improved veneer with consideration being given to the fact that with a moisture content at or more than the f.s.p. lumber does not undergo the aforementioned phenomena of swelling or shrinking due to changes in the amount of the contained moisture. In the improved process, according to the present invention, the flitches have no difficulties as mentioned above as regards to whether they are dry or moist. Thus, no inner stress is generated or produced at the joined parts between the flitches, so that no distortion, warp, or cleavage will occur in the veneers sliced from the laminated flitch according to the present invention.

Furthermore, by making use of the aforementioned concept according. to the present invention, any sheets of veneer of wide or large area can be overlaid over a substrate by a single operational step to form a fancy board having desirable patterns of wood grain and inconspicuous joint lines. Of course veneers of narrow area may also be produced as desired.

An object of the present invention is to provide a process for industrially mass-producing sliced veneer sheets having desirable patterns and inconspicuous joint-lines in large quantities and in which the veneer sheets have a wide area large enough to cover an entire substrate in a single operational step without troublesome mending or patching as was required in gluing conventional sliced veneers.

Another object of the present invention is to provide a process for industrially mass-producing sliced veneers to be glued over an entire substrate in large quantities and in which the veneer is provided with desirable technological and esthetic patterns, for example checker patterns, mosaic patterns and so on formed by a combination of arrangements of the grain pattern of the wood.

A further object of the present invention is to provide a process for industrially mass-producing sliced veneers to be glued over an entire substrate in one operational step thereby reducing the amount of labor required.

Still another object of the present invention is to provide a process for industrially mass-producing a fancy board in a single operational step by gluing a sheet of sliced veneer of wide area onto a substrate, and without having to place in order a plurality of small sliced veneers on the substrate one by one as was required heretofore.

Other features which are considered as characteristic for the invention as set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

SUMMARY OF THE INVENTION

A process for producing a sheet of wood veneer having a large area adaptable for mass-production and adaptable to be made with various wood patterns includes dividing a log into a plurality of flitches, smoothing the surfaces of the flitches which are subsequently to be joined, applying an adhesive to the smoothed surfaces to be joined, joining the flitches at the adhesive-bearing surfaces to form a composite flitch, slicing the composite flitch to the desired thickness to produce a sheet of veneer, and carrying out the above production of the sheet of veneer while maintaining the moisture content of wood at or above the fiber saturation point.

BRIEF DESCRIPTION OF THE DRAWINGS

The construction and method of operation of the invention together with additional objects and advantages thereof will be best understood from the following description of specific embodiments when read in connection with the accompanying drawings, in which.

DESCRIPTION OF THE PREFERRED EMBODIMENTS

Figure 1:
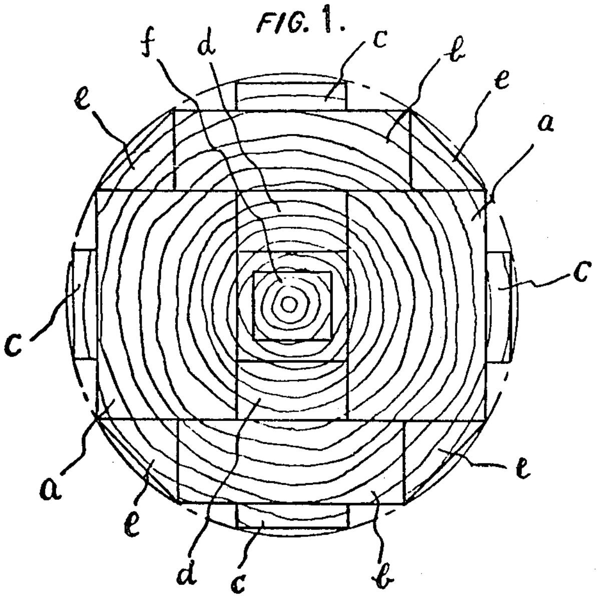
FIG. 1 is an end view showing the dividing arrangement of a log as related to a first embodiment of the present invention.

First refering to the process steps of the present invention, an original log is first divided vertically into small flitches. All of the surfaces of the flitches are then smoothed so that such surfaces may correspond to mating surfaces to be closely joined with each other. The smoothed flitches are arranged to form a large laminated or composite flitch of the required size taking into account the desired pattern for the sliced veneer to be overlaid on a substrate.

At the step of joining the flitches together, colorless or colored hydrophilic adhesive is applied to the surfaces to be mated to each other. A laminated flitch formed according to the aforementioned three steps is sliced into a sheet of veneer of desired thickness comprising patterns created by the grain of the wood. Throughout the aforementioned process steps for providing sheets of sliced veneer, it is necessary that they be carried out while the moisture content is more than the f.s.p. After storing for a period of time as may be necessary while taking care to keep them with the same moisture content, the sliced veneer provided according to the aforementioned four steps is finally overlaid and glued onto a substrate by means of hydrophilic adhesive spread all over the surface of the substrate.

A hydrophilic adhesive as used herein, means a type of adhesive which is soluble in water itself or in solvent such as alcohol or acetone, the solution of which can be miscible with water, whereby the adhesive is suitable for use preferably in the range of 50–150 $g/m^2$. Examples of such adhesive include epoxy resin, phenolic resin, resorcinol resin, and the like. These adhesives may be mixed for use so long as they are compatible with each other.

Further, there may be added to the hydrophilic adhesives, suitable dyestuffs, pigments or mixtures thereof for the purpose of shading and/or lining. In this case, dyestuff thus added diffuses in the direction of the axis of the flitch along the fiber texture and amorphous region due to the capillary phenomena or ionic absorption to provide shading to the cutting ends and the part adjacent thereto of the flitch. On the contrary, the dyestuff does not diffuse to the same extent in the radial and tangential direction. Therefore, when joining the cross sections with radial or tangential sections alternatively, shadow effect caused by shading falling partially near the joints, and as a whole, laminated flitch seems to have a cubic pattern like a wickerwork (so called "ajiro" in Japanese).

Pigment may be added to the adhesive. However, since the pigment does not diffuse in any direction of the flitch, clear color remains at the lines of the joint.

For the purpose of giving the impression of a shadow to the flitch, water soluble stain such as alizarine red S and methylene blue or water insoluble stain such as Sudan II, azo type dyestuff and cyanine type dyestuff are used as a dyestuff to be added to the adhesive in the range of 0.1 to 10% by weight. In case of water insoluble dyestuffs, the latter is added to the adhesive after dissolving in a solvent miscible with water, for example, alcohol, acetone, or the like.

As regards the use of pigment, pigment such as titanium white, red iron oxide, chrome yellow, or the like is mixed with the adhesive, and even metallic powder such as gold dust may be used.

The sliced veneer thus produced can be glued onto a substrate successively just after slicing, but it is usual to glue it onto a substrate after preserving in storage for a period of time while maintaining the moisture content therein.

As for the substrate, wood, plywood, particle board, hard board, paper, plastic sheet, cement board, ceramic board, metallic board and so on are all usable.

Although as regards the adhesive, a hydrophilic type can be used as described above, it is preferable that it should be an adhesive belonging to the group of thermoplastic resins such as vinyl acetate emulsion, ethylene vinyl-acetate copolymer emulsion or mixtures of the same and belonging to the group of thermosetting resins, such as mixtures of vinyl-acetate emulsion and urea resin, of vinyl-acetate emulsion and phenolic resin, and of ethylene vinyl-acetate copolymer emulsion and phenolic resin.

At the time of gluing, a sheet of sliced veneer is glued on to the substrate in one operational step through a hot gluing process, and optionally, a plurality of sheets of sliced veneer may be used to obtain a large quantity of fancy board having artistic patterns.

Several embodiments of the process for producing a sliced veneer or a fancy board made therefrom on the basis of the present invention will be described as follows.

THE FIRST EMBODIMENT (FIGS. 1–4)

Figure 2:
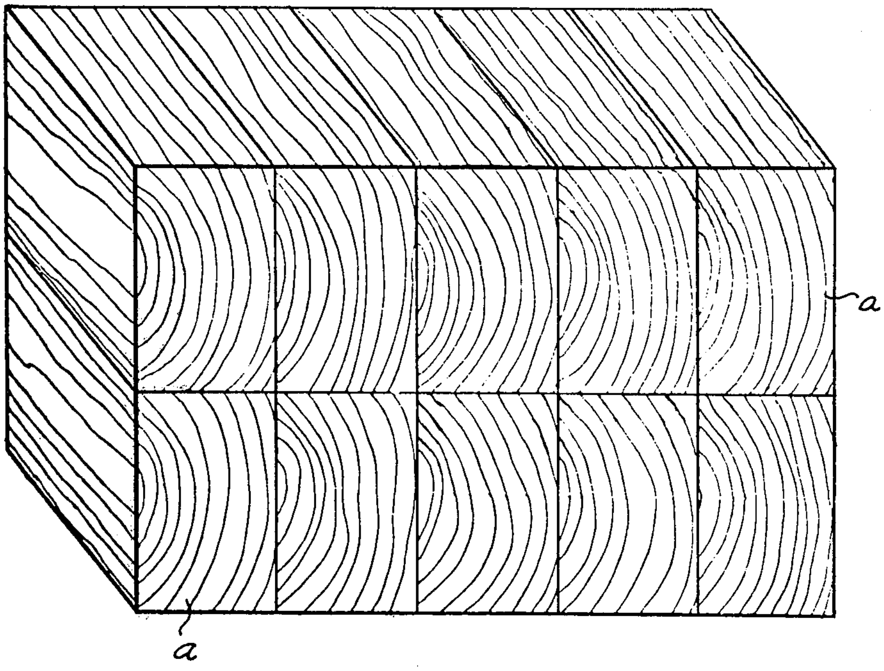
FIG. 2 is a perspective view of a laminated or composite flitch consisting of divided smaller flitches as related to the same embodiment.
Figure 3:
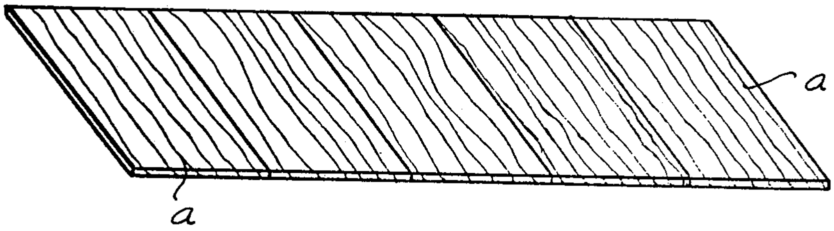
FIG. 3 is a perspective view of a sheet of veneer sliced horizontally from the laminated flitch in FIG. 2.
Figure 6:
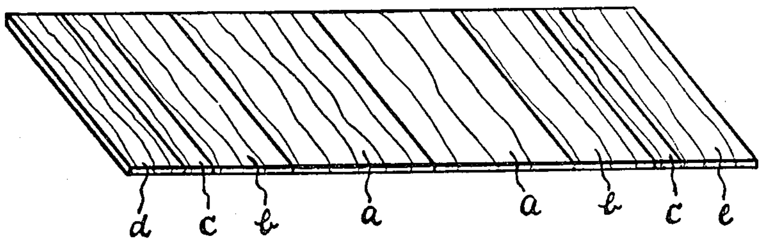
FIG. 6 is a perspective view of a sheet of veneer sliced horizontally from the laminated flitch in FIG. 5.
Figure 4:
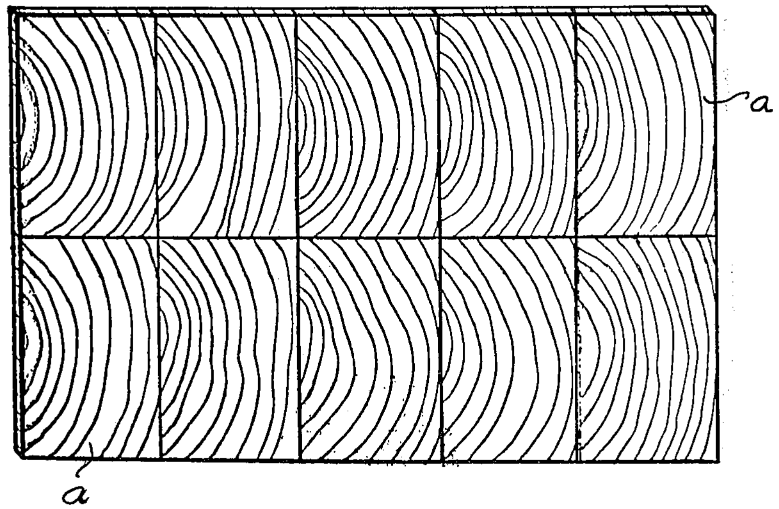
FIG. 4 is a perspective view of a sheet of veneer sliced vertically from the laminated flitch in FIG. 2.

Flitches are sawed off from a log (80% moisture content) as shown in FIG. 1 and are joined with epoxy resin adhesive as shown in FIG. 2. Slices or sheets of veneer 0.2 mm thick as shown in FIGS. 3 and 4 are obtained by slicing the thus obtained laminated flitch perpendicularly to the joined surface. It will be seen that the sheet of veneer in FIG. 4 is made up of a plurality of flat sections of wood in which the grain in each section of wood extends generally in the same direction. All of the aforementioned processes are carried out with the moisture content more than f.s.p. and the thus obtained veneer is maintained with the same moisture content condition.

THE SECOND EMBODIMENT (FIGS. 1, 5, 6 and 7)

The log in FIG. 1 (80% moisture content) was sawed to make the following flitches as illustrated in FIG. 1;

- two flitches *a* 90cm high, 65cm long and 55 cm wide
- two flitches *b* 90cm *h*, 65 cm *l* and 32cm *w*
- four flitches *c* 45 cm *h*, 65cm *l* and 10cm *w*
- two flitches *d* 45cm *h*, 65cm *l* and 22 cm *w*
- four triangular solids *e* $32/\sqrt{2}$cm *h*, 65cm *l* and 32 $\sqrt{2}$cm base and
- one flitch *f* 26cm *h*, 65cm *l* and 32cm *w*

Figure 5:
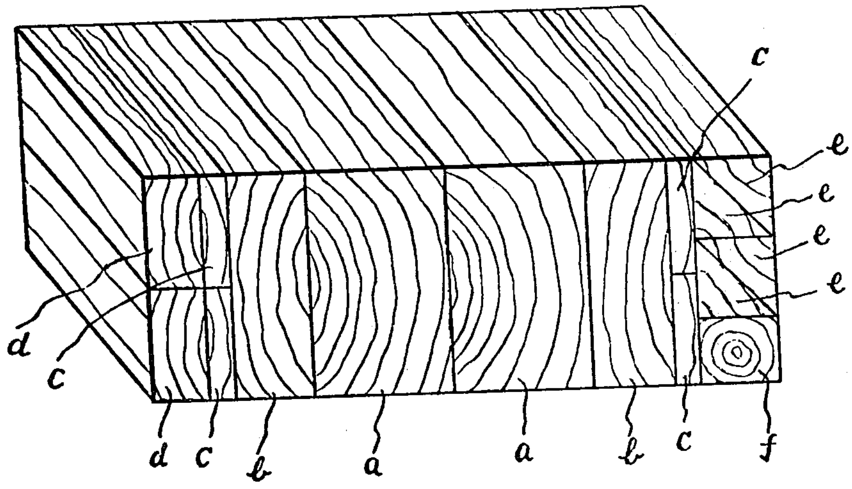
FIG. 5 is a perspective view of a laminated flitch as related to a second embodiment.
Figure 7:
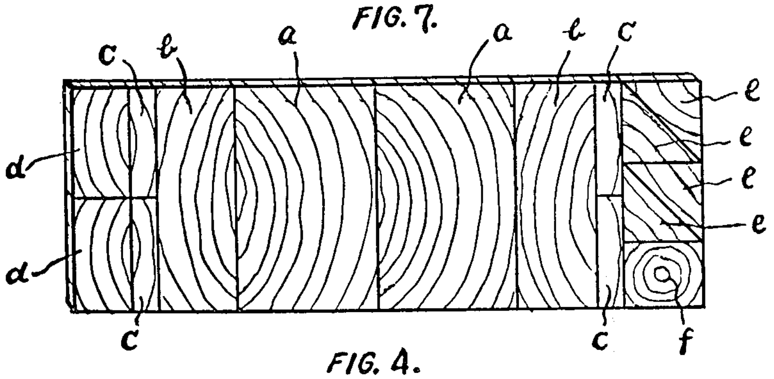
FIG. 7 is a perspective view of a sheet of veneer sliced vertically from the laminated flitch in FIG. 5.

After smoothing the surfaces of these flitches, they are joined together with phenolic resin adhesive to form a laminated flitch having a size of 90cm high, 65cm long and 248cm wide as shown in FIG. 5. The height of 90cm and width of 248cm can readily be determined and calculated from the above dimensions of the individual flitches. The above dimensions are merely an example for illustrative purposes and other sizes may be utilized. The laminated flitch may be sliced along a horizontal plane as viewed in FIG. 5 into a 0.1 to 0.8mm thick sheet to obtain veneer sheet as shown in FIG. 7 in response to required pattern. Thus it will be seen that the veneer sheet in FIG. 7 is made up of a plurality of thin flat sections of wood joined to each other at lateral abutting edges by adhesive. It will also be seen in FIG. 7 that some of the sections of wood have their grain generally perpendicular to the general plane of the sheet of veneer and other sections of wood have their grain generally parallel to the general plane of the sheet of veneer. These operations are carried out while the wood has a moisture content more than the f.s.p. and the moisture content in the original lumber is maintained also in the finished veneers under the same moisture conditions.

THE THIRD EMBODIMENT (FIGS. 8–11)

Figure 8:
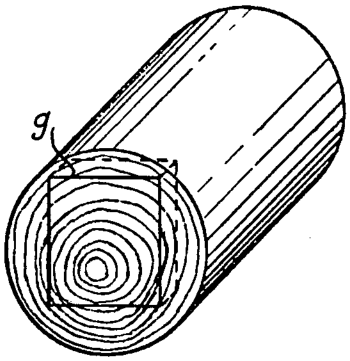
FIG. 8 is a perspective view of a log as related to a third embodiment.
Figure 9:
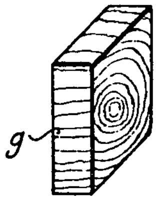
FIG. 9 is a perspective view of a flitch divided from the log shown in FIG. 8.
Figure 10:
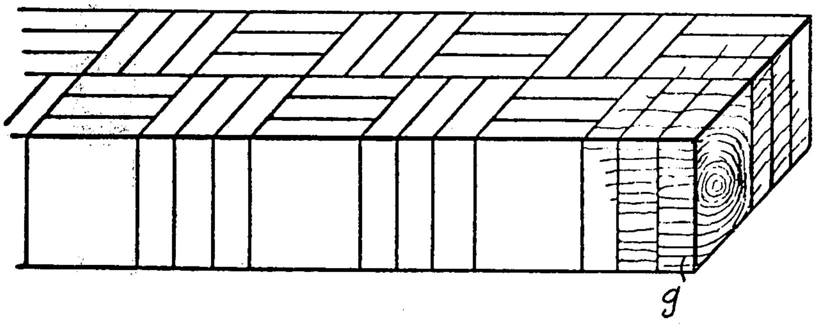
FIG. 10 is a perspective view of a laminated flitch consisting of a plurality of flitches of the type shown in FIG. 9.

Flitches *g* as shown in FIG. 9 are sawed off from a log with a 60% moisture content as is shown in FIG. 8 and are smoothed at all the surfaces and combined together as in FIG. 10 by means of resorcinol resin adhesive to form a checker pattern.

Figure 11:
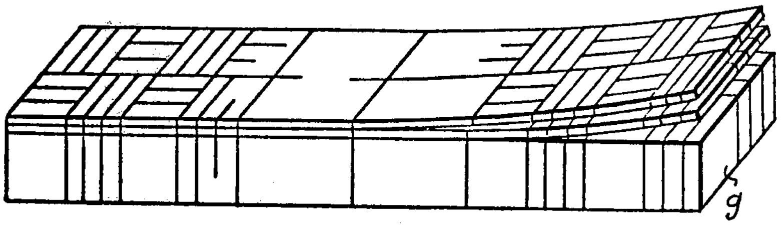
FIG. 11 is a perspective view showing the slicing step in slicing the laminated flitch in FIG. 10.

Subsequently, the laminated flitch is sliced in the manner shown in FIG. 11. All of the aforementioned steps are carried out with a moisture content of 60% and the sheet of veneer is maintained with the same moisture content.

THE FOURTH EMBODIMENT (FIGS. 12–14)

Figure 12:
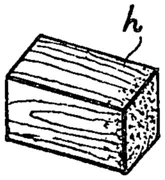
FIG. 12 is a perspective view of a flitch as related to a fourth embodiment.
Figure 13:
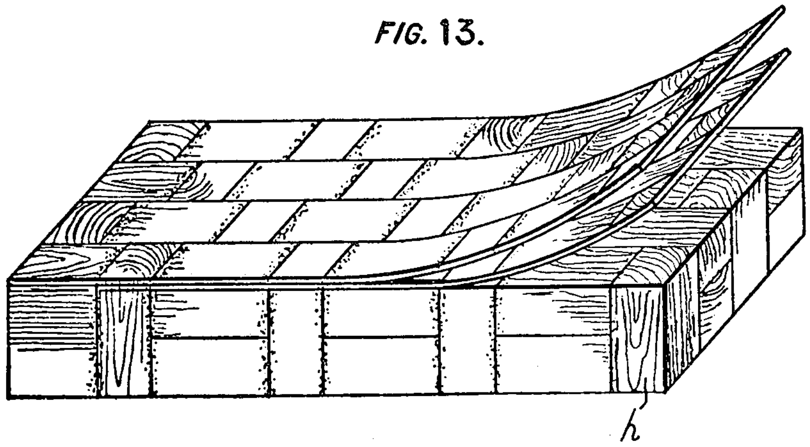
FIG. 13 is a perspective view of a laminated flitch consisting of a combination of flitches of the type shown in FIG. 12.
Figure 14:
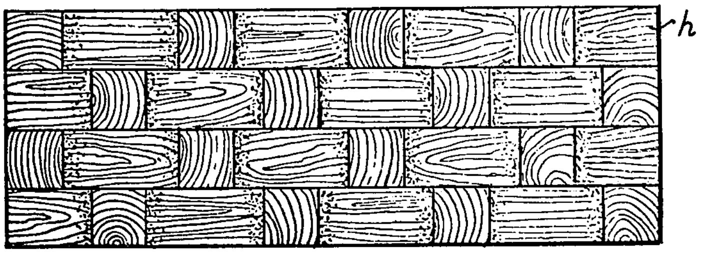
FIG. 14 is a plan view of a sheet of veneer sliced from the laminated flitch in FIG. 13.

Flitches *h* as shown in FIG. 12 are sawed from a log with a 120% moisture content and are arranged and combined with each other to obtain a laminated flitch as shown in FIG. 13 by using urea resin adhesive in which 1% of Alizarine red S is added as a dyestuff, thus producing a shadowed portion which is shown as the dotted portions in FIGS. 12 to 14. The top surface of the laminated flitch as seen in FIG. 13 consists of a combination of ranks or rows in which radial or tangential sections and cross sections of the sawed flitches are arranged alternately in an orderly manner, to obtain a pattern which looks like a kind of wickerwork pattern. All of the aforementioned steps are carried while the moisture in the lumber is maintained and veneers of 0.4mm thickness are sliced from the laminated flitch (FIG. 14). In joining the flitches together, dyestuff which is added to the adhesive diffuses longitudinally along the flitches almost from the cross section along the direction of the fiber texture in the flitch as in FIG. 12, and therefore there is presented a cubic effect on the surface of the veneer shown in FIG. 14, which is created by the relationship between the flitch sections having the grain thereof generally parallel to the general plane of the veneer sheet having shaded portions adjacent the abutting edges caused by the penetrating dyestuff partly at both ends thereof and the colorless cross sections at the portions adjacent the abutting edges of the flitch sections having their grain generally perpendicular to the general plane of the veneer sheet.

THE FIFTH EMBODIMENT (FIG. 15)

Figure 15:
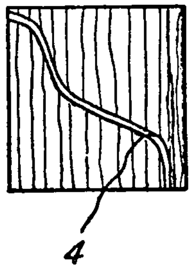
FIG. 15 is a plan view of a sheet of sliced veneer as related to a fifth embodiment.

As shown in FIG. 15, curved flitches which are sawed from a log with a 35% moisture content are joined together by means of epoxy resin adhesive with 3% titanium deoxide. The joined flitch is sliced to make 0.3mm thick veneer sheets having a curved groove pattern. The same percentage of moisture content is maintained during the processing steps.

THE SIXTH EMBODIMENT (FIG. 16)

Figure 16:
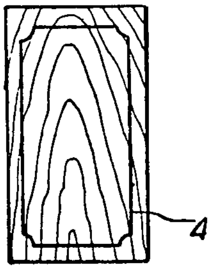
FIG. 16 is a plan view of a sheet of sliced veneer as related to a sixth embodiment.

As shown in FIG. 16, a sliced veneer may be provided with a groove in the form of a picture-frame pattern.

THE SEVENTH EMBODIMENT (FIGS. 17–21)

Figure 21:
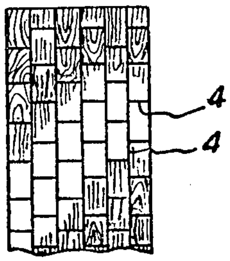
FIGS. 17, 18, 19, 20 and 21 are respectively plan views of various examples of sliced veneers as related to a seventh embodiment.
Figure 17:
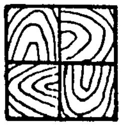
Figure 19:
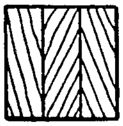
Figure 18:

Various patterns or combination of patterns may be provided on the flitches as indicated in the prior embodiments and many different kinds of sliced veneers with different patterns can be formed. For example, the arrangement may include the grain pattern shown in FIG. 17 or FIG. 18, the V-pattern shown in FIG. 19, the striped pattern shown in FIG. 20 and the laid-bricks pattern in FIG. 21.

THE EIGHTH EMBODIMENT (FIG. 22)

Figure 20:
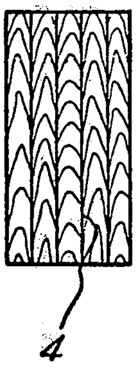
Figure 22:
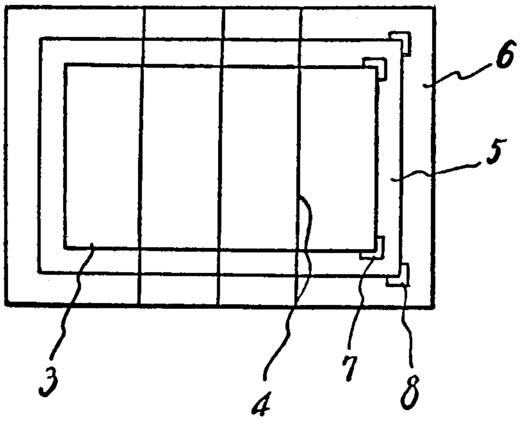
FIG. 22 is a plan view of a sheet of sliced veneer overlaid onto a substrate 5 set on a working table 6 for making a fancy board according to an eighth embodiment.

Sliced veneer 3 having a striped pattern such as shown in FIG. 20 or in the other embodiments is overlaid onto a sheet of plywood using vinyl-acetate emulsion as the adhesive and then grooves are made in the surface of the sliced veneer along the joint lines 4, thereby producing a fancy plywood. In FIG. 22, reference numeral 5 indicates a sheet of plywood, 6 indicates a working table, and 7 and 8 indicate stopper mark means.

THE NINTH EMBODIMENT (FIGS. 23–24)

Figure 24:
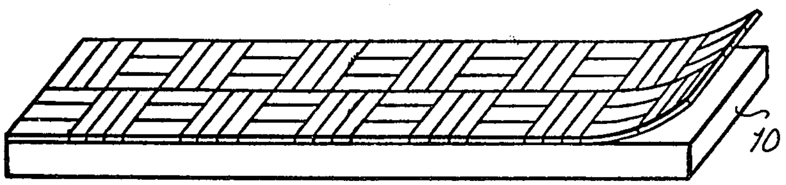
FIGS. 23 and 24 are each perspective views showing a finished fancy board overlaid with a sliced veneer.
Figure 23:
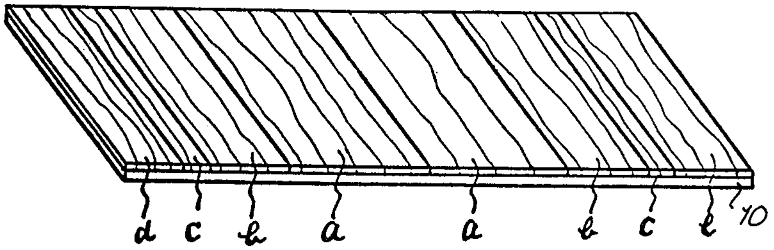

FIG. 23 shows one of the sliced sheets of veneer as produced in the aforementioned embodiments glued onto a substrate of desirable size, for example plywood in this case, with vinyl-acetate emulsion being used as the adhesive employing the hot gluing process. FIG. 24 shows the sheet of veneer on the substrate which is produced by the process of the third embodiment using flitches *g* shown in FIG. 9. In FIGS. 23 and 24, numeral 10 shows a substrate. After slicing and during storage the moisture content of the veneer sheet is maintained. The aforementioned process may be used for producing fancy board. Wood, plywood, particle board, cement board, paper, plastic sheet, ceramic board or metallic board are examples of materials which may be used as a substrate. For the adhesive, ethylene vinyl-acetate coploymer emulsion, a mixture of the aforementioned emulsion and urea resin, or a mixture of vinyl-acetate emulsion and urea resin may be used.

Turning now from a description of specific embodiments to a general description pertaining to all of the embodiments it will be noted that as previously set forth, the "f.s.p." or fiber saturation point is a point representing the condition in which lumber contains a certain quantity of moisture therein. Moisture in lumber consists of free water which is contained in the cells and bound water which is contained in the cell walls. When moisture in the lumber evaporates during drying, the bound water starts to evaporate after the free water has evaporated. The f.s.p. indicates the condition wherein the cell walls of the lumber is saturated with bound water after all the free water has evaporated. When further evaporation of moisture occurs beyond this point, the lumber starts to shrink and change physically. The moisture content at the f.s.p. is about within the range of 25 to 35% depending on the type of wood.

While the invention has been described by means of specific examples and in specific embodiments, it is not intended to be limited thereto, for obvious modifications will occur to those skilled in the art without departing from the spirit and scope of the invention.

What is claimed is:

1. A sheet of veneer suitable to be affixed to a substrate comprising a plurality of thin flat sections of wood, each of said thin sections of wood comprising a portion of a flitch obtained from a log, said flat sections of wood having a substantially constant thickness of from about 0.1 mm to about 0.8 mm, said flat sections of wood having a flat front and a flat back bounded by lateral edges, said plurality of flat sections of wood being arranged in a flat coextensive array with said lateral edges abutting one another and adhesive means joining said abutting edges of said plurality of flat sections of wood to form said sheet of veneer.

2. A sheet of veneer according to claim 1 wherein said sheet of veneer has a width of up to 90 cm wide and a length of up to 248 cm.

3. A sheet of veneer according to claim 1 wherein the grain of the wood in all of said flat sections of wood extend generally in the same direction in the sheet of veneer.

4. A sheet of veneer according to claim 1 in which the grain of at least some of said flat sections of wood is generally perpendicular to the general plane of the sheet of veneer.

5. A sheet of veneer according to claim 4 in which the grain of at least some of said flat sections of wood is generally parallel to the general plane of said veneer.

6. A sheet of veneer according to claim 5 wherein said adhesive means comprises a coloring in the form of a dye, pigment or mixtures thereof which penetrates and diffuses into said wood in the general direction of the grain, portions of said wood adjacent the abutting edges of said flat sections of wood having their grains generally parallel to the general plane of said sheet of veneer exhibiting color penetration, while portions of wood adjacent the abutting edges of said flat sections of wood having their grains generally perpendicular to the general plane of said sheet of veneer being colorless, whereby said sheet of veneer has a variable color pattern at the abutting edges of said sections of wood as determined by the relative grain orientation of said sections of wood.

* * * * *